United States Patent [19]

Cernek, Jr.

[11] 3,832,629
[45] Aug. 27, 1974

[54] BATTERY CONDITION INDICATOR
[75] Inventor: Edward Cernek, Jr., Santa Ana, Calif.
[73] Assignee: ADAR, Inc., Santa Ana, Calif.
[22] Filed: Jan. 26, 1973
[21] Appl. No.: 326,894

[52] U.S. Cl............. 324/29.5, 340/249, 340/248 D
[51] Int. Cl...................... G01n 27/42, G08b 21/00
[58] Field of Search.... 324/29.5; 340/248 B, 248 C, 340/248 D, 249; 320/48

[56] References Cited
UNITED STATES PATENTS
3,321,754  5/1967  Grimm et al.................. 340/249
3,550,105  12/1970  De Cola et al................ 324/29.5 X Primary Examiner—Alfred E. Smith
Assistant Examiner—Rolf Hille
Attorney, Agent, or Firm—Knobbe, Martens, Olson, Hubbard & Bear

[57] ABSTRACT

A Battery Voltage Indicator is provided for indicating the condition of the battery or dry cells or the like by providing light flashes or a steady light from a light emitting diode when the battery voltage is in the range for a usable battery. A multi-vibrator is connected to derive its operating voltage from the battery being tested and produces an output wave that fluctuates above and below a given fraction of the multi-vibrator battery voltage but having upper and lower levels each dependent upon the battery voltage. A circuit for the light emitting diode is provided which is energized when the voltage input is above the predetermined level. Consequently the diode either emits light continuously, flashes, or remains dark, depending upon whether the battery is good, weak, or dead.

8 Claims, 2 Drawing Figures

PATENTED AUG 27 1974                                      3,832,629
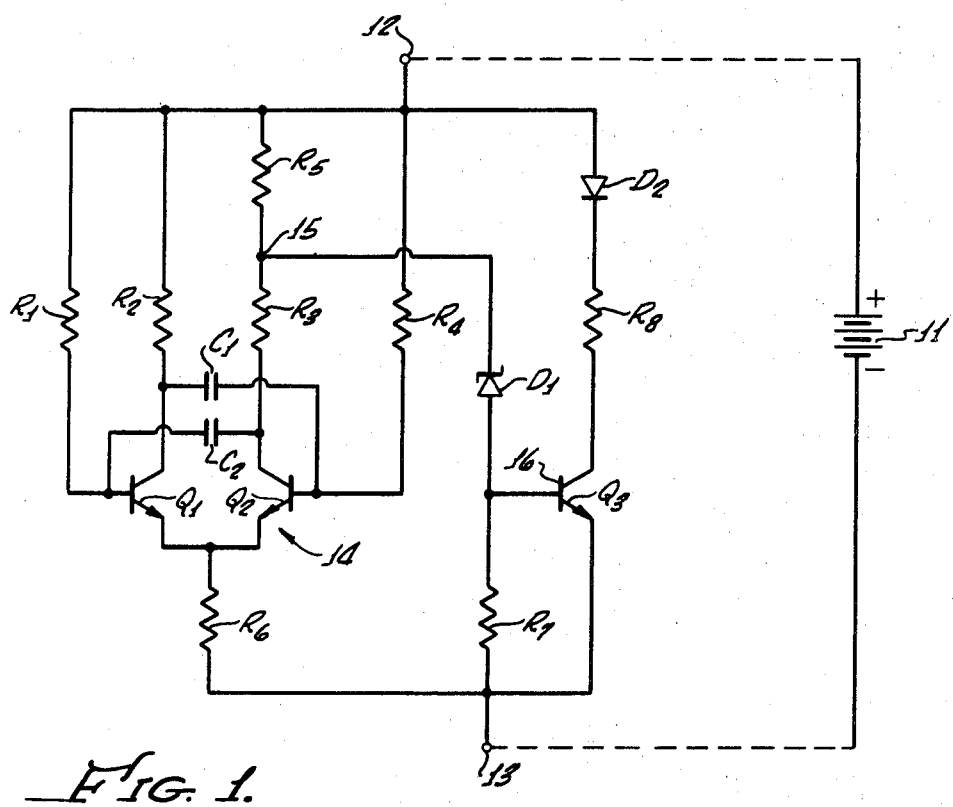
Fig. 1.
Fig. 2.
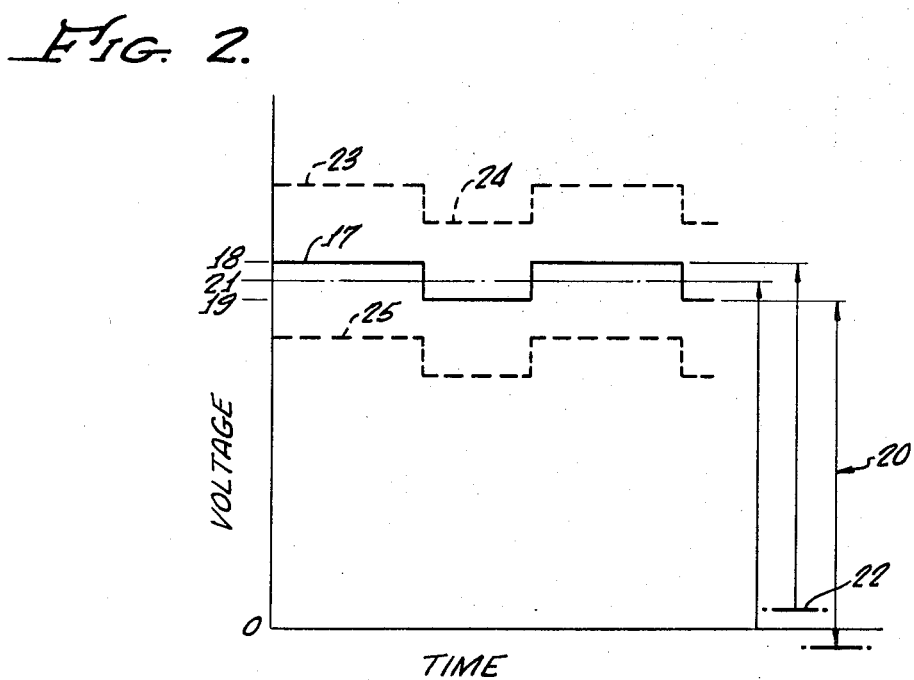

BATTERY CONDITION INDICATOR

SUMMARY OF THE INVENTION

In carrying out the invention in accordance with the preferred form thereof, a multi-vibrator type of oscillator is provided having power supply terminals which are the terminals to which a battery to be tested is connected. For producing battery-condition indication a lamp is provided in the form of a light emitting diode, which is also connected in series with the input terminals, and a solid state switch is connected in series with the light emitting diode. The switch has a base coupled to a suitable point, such as an intermediate point in a load resistor of one stage of the multi-vibrator so that a variable voltage is applied to the base of the solid state switch to turn the switch on or off depending upon the voltage supply. Preferably the base is coupled to the multi-vibrator load circuit by a Zener Diode so that the switch is turned on only when the output voltage of the multi-vibrator circuit is above a predetermined voltage.

The point at which the voltage is taken for the multi-vibrator is so selected that the lower level voltage of the multi-vibrator output is a large fraction, 9/10 for example, of the upper level voltage, which approximates the battery voltage. Both voltages of the multi-vibrator output wave depend upon and are substantially proportional to the battery voltage. Consequently, for a good battery the voltage applied to the solid state switch is high enough so that the switch is always turned on and the light emitting diode is illuminating steadily. However, for a battery which is weak and still usable for a period of time the voltage applied to the switch will be high enough to turn it on only during the higher voltages of the multi-vibrator output wave so that the light emitting diode is luminous intermittently and flashes. On the other hand if the battery is dead or has such a low voltage that satisfactory operation will not be obtained from it, the output voltage wave of the multi-vibrator never becomes sufficiently high to turn on the switch and the light emitting diode remains dark.

A better understanding of the invention will be afforded by the following detailed description considered in conjunction with the accompanying drawing.

DRAWING

FIG. 1 of the drawing is a circuit diagram of an embodiment of the invention; and FIG. 2 is a graph illustrating the principle of operation.

DETAILED DESCRIPTION

As illustrated in FIG. 1 of the drawing, a battery 11, the condition of which is to be indicated, is arranged for connection to positive and negative terminals 12 and 13, respectively. The terminals 12 and 13 serve as power supply terminals for an oscillator 14 of the type that produces a direct-current output wave which fluctuates between the upper and lower voltage levels. In a preferred form of the invention the oscillator 14 takes the form of an astable multi-vibrator including transistors Q1 and Q2, shown as NPN transistors.

The collector-emitter circuits of the transistors Q1 and Q2 are connected between the terminals 12 and 13 and cross coupled by conventional resistor-capacitor coupling. As shown there are a resistor R1 connected between the power supply terminal 12 and the base of the transistor Q1, a resistor R2 connected between the terminal 12 and the collector of transistor Q1, a resistor R3 in the collector circuit of the transistor Q2, a resistor R4 connected between the terminal 12 and the base of the resistor Q2, a resistor R5 connected in series with the resistor R3 so that the resistors R3 and R4 together form a collector load circuit for the transistor Q2 with a junction terminal 15 utilized as the voltage output terminal of the multi-vibrator 14. The transistors Q1 and Q2 have a common emitter connection to the terminal 13 through an emitter resistor R6.

For providing luminous indications of the condition of the battery 11, a lamp is provided preferably one having a very low current demand such as a light-emitting diode D2. The light emitting diode D2 is connected in series with a transistor Q3, shown as an NPN transistor, between the terminals 12 and 13. The transistor Q3 serves as a voltage-responsive solid state control switch for the light emitting diode D2.

The transistor Q3 has a base 16 coupled to the voltage output terminal 15 of the multi-vibrator 14. Preferably means are provided between the multi-vibrator output terminal 15 and the control base 16 of the transistor Q3 which depress the voltage applied to the base 16, the switch Q3 being of the type which readily saturates at a low voltage between its base and emitter.

In the arrangement illustrated, the coupling circuit between the multi-vibrator output terminal 15 and the base 16 of the solid state switch Q3 comprises a Zener Diode D1. A resistor R7 is connected between the base 16 and the negative terminal 13, providing a current path for any leakage properties that the Zener diode may have had prior to the current breakdown. To augment the current-limiting properties of the light emitting diode D2, a current limiting resistor R8 is connected in series with the diode D2 and the solid state switch 16.

The relative values of the resistors R3 and R5 are so chosen that the lower level voltage of the multi-vibrator output is a relatively large proportion of the upper level voltage, such as to approximate 9/10 for example.

A Zener Diode D1 is chosen which has a breakdown voltage such that the potential at the base 16 will rise above the potential at the terminal 13 (plus the base-emitter junction voltage of the transistor Q3) and remain above this level even for the minimum level of voltage of the multi-vibrator output when the potential difference between terminals 12 and 13 is high enough to represent a good battery, but the voltage at the base 16 will not rise above that at the terminal 13 at any time in the case of a dead battery.

As illustrated in FIG. 2, in the case of a weak, but not dead battery, the output voltage of the multi-vibrator circuit 14, the voltage appearing at the terminal 15 is a fluctuating wave having maximum and minimum voltages 18 and 19 fluctuating about a level represented by a line 21. The Zener Diode D1 is chosen to have a breakdown voltage approximating the voltage level 21 represented by potential difference 20. In case of a weak battery the voltage at the terminal 15 will fluctuate between the levels 18 and 19 with the voltage applied to the base 16 fluctuating between the levels 22 and zero. The voltage supplied by the Zener Diode D1 at the base 16 cannot fall below zero. Consequently, the solid state switch Q3 is alternately in saturated and in non-saturated condition with the switch turned on or off and the lamp D2 is intermittently luminous to provide flashes.

On the other hand, in the case of a strong battery having a voltage represented by the level 23, the output of the multi-vibrator at the terminal 15 fluctuates between level 23 and 24 so that the voltage remains constantly above the voltage level 21, the diode D1 conducts continuously and the switch 23 remains turned on continuously to provide continuous illumination from the light emitting diode D2.

Then in the case of a dead battery or one having an output voltage which is so low that it is not satisfactory, the voltage at terminal 15 never arises above a level 25, which is not above the breakdown voltage of a diode D1, the transistor Q3 remains turned off continuously and the lamp D2 remains dark.

The invention is not limited to the use of particular circuit constants; however satisfactory operation has been obtained and five to ten light flashes per second have resulted with the resistor values approximately as follows: R1 1,000 ohms, R2 10,000 ohms, R3 10,000 ohms, R4 1,000 ohms, R5 1,000 ohms, R6 1,000 ohms, R7 1,000 ohms, R8 2,000 ohms, and with capacitor C1 0.22 micro farads and C2 0.22 MF.

A specific circuit arrangement has been illustrated and described by way of example but it will be understood that the invention is not limited to the embodiment illustrated and various modifications will suggest themselves to those skilled in the art without departing from the spirit of the invention.

What is claimed is:

1. A Battery Condition Indicator comprising in combination:
   a pair of input terminals for connection to a battery, the condition of which is to be tested;
   an oscillator having an input connected to said terminals and having as a voltage output an oscillation wave that is DC biased by the voltage of said battery connected to said input;
   an indicator circuit including a switch having a voltage responsive control element and means coupling said control element to the output of said oscillator, whereby the response of the indicator is dependent upon the voltage attained by the oscillator output.

2. A Battery Condition Indicator as described in claim 1 wherein the oscillator is an astable multi-vibrator with:
   a load circuit; and
   coupling means between a point in said load circuit and said switch control element.

3. A Battery Condition Indicator as described in claim 2 wherein the switch is a transistor with a relatively low saturation voltage and the coupling between the switch control element and the multi-vibrator circuit includes means for depressing the voltage applied to the control element.

4. A Battery Voltage Indicator as described in claim 2 in which the load circuit coupling to the switch control element comprises a Zener diode.

5. A Battery Condition Indicator as described in claim 1 wherein the switch comprises a transistor with a base, collector and emitter with a base-current discharge resistor connected between the base and the emitter, with a Zener diode coupling the base to the oscillator output.

6. A Battery Condition Indicator as described in claim 1 wherein the switch is responsive to a predetermined minimum voltage and a lamp is included in the indicator circuit whereby the battery condition is indicated by steady illumination from said lamp, flashing light, or the lamp remaining dark dependent upon the upper and lower voltage level output of the oscillator in relation to the voltage at which the switch becomes responsive.

7. A Battery Condition Indicator as described in claim 6 wherein the lamp is a light emitting diode connected in series with the switch to said input terminals.

8. A Battery Condition Indicator, comprising:
   a pair of input terminals for connection to a battery, the condition of which is to be tested;
   a voltage responsive circuit connected to said input terminals for producing an oscillation wave that is DC biased by the voltage of said battery, the maximum and minimum voltages of said oscillation wave having a voltage level which is proportional to the voltage difference between said input terminals; and
   an indicator circuit including a switch which is actuated by a predetermined voltage level, said switch coupled to said oscillation wave, said indicator producing a signal whenever said oscillation wave voltage exceeds said predetermined voltage level.

* * * * *